Oct. 25, 1966     O. A. SWANSON     3,280,664

CONTAINER COVER REMOVER AND TIGHTENER MECHANISM

Filed Oct. 29, 1964     2 Sheets-Sheet 1

INVENTOR.

BY *Oscar A. Swanson*

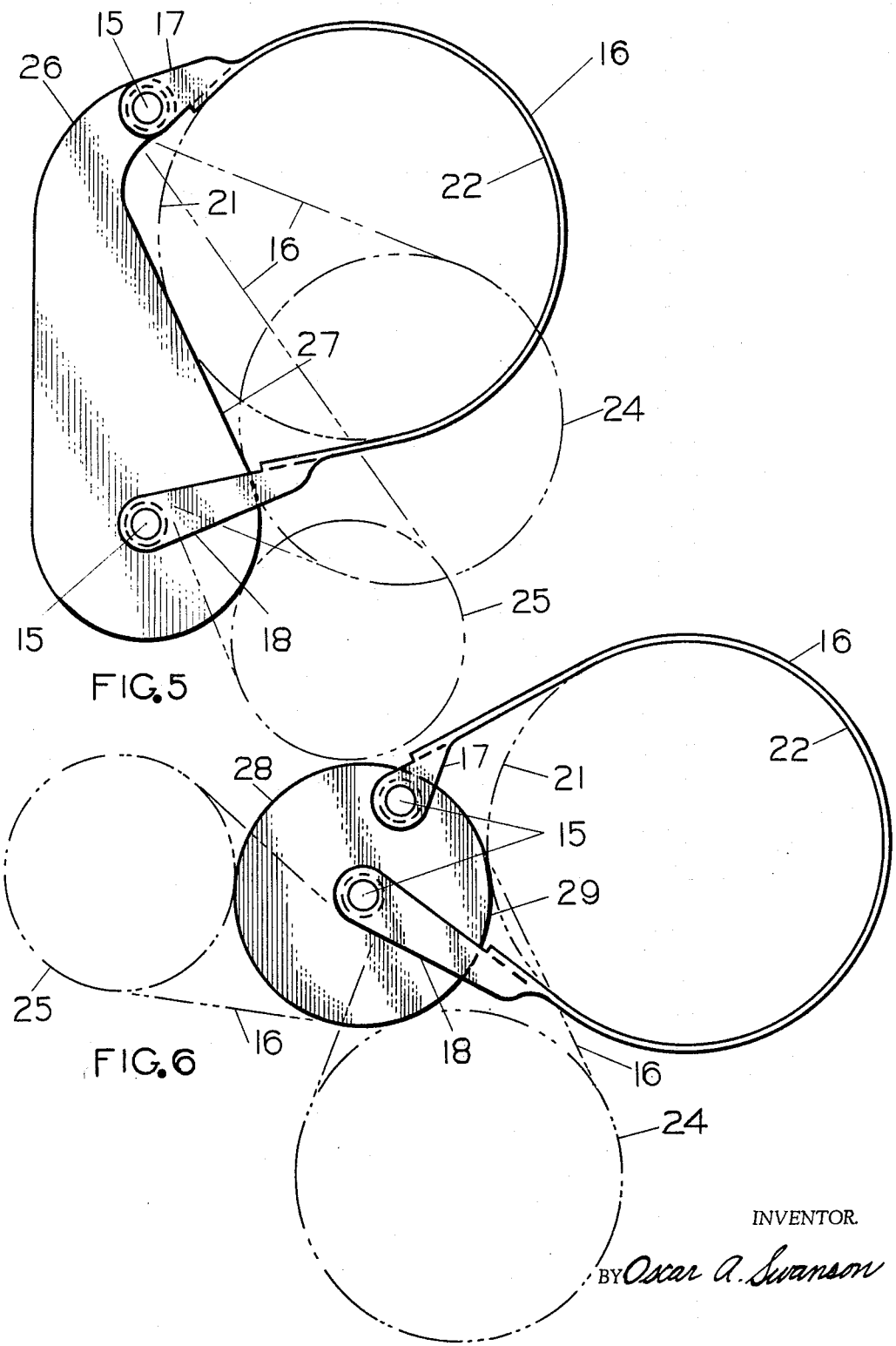

United States Patent Office 3,280,664
Patented Oct. 25, 1966

3,280,664
CONTAINER COVER REMOVER AND
TIGHTENER MECHANISM
Oscar Alfred Swanson, 550 Almar Ave.,
Pacific Palisades, Calif.
Filed Oct. 29, 1964, Ser. No. 407,509
3 Claims. (Cl. 81—3.43)

This invention relates to a container cover remover and tightener mechanism which is adapted to the removal and installation of various sizes of container screw or twist-off top covers and is self adjusting to different diameters of said covers. It is adapted to be fastened to the underside of various fixtures such as shelves, cabinets, counters, tables and other fixtures used in kitchens.

In certain respects, this mechanism is an improvement of that shown in my United States Letters patent application, filing date June 5, 1964, Serial No. 372,793, Group 350, and entitled, "Container Jar Lid Tool Mechanism."

The general object of my invention is to provide the house-wife with a device which is supported by a convenient kitchen fixture, and which is self adjusting to clasp container covers of different diameters and easily effect their removal or tightening.

It is another object of my invention to provide a device of extreme simplicity and low cost.

A further object is to provide a device that will not damage the container covers upon which it is used.

Other objects and advantages of this invention will be apparent from the following description and accompanying drawings in which similar characters of reference indicate similar parts throughout the several views.

FIGURE 1 is a front elevational view of a container cover remover and tightener mechanism, and in which view it is shown enclasping a large diameter container screw top cover in a position for removal. The fixture upon which it is mounted is illustrated in dot and dash lines. This view also depicts several container screw top covers of different diameters in positions of mechanism for removal and which are illustrated in dot and dash lines;

FIGURE 5 is a front elevational view similar to FIG. 1 showing the container cover remover and tightener mechanism in which the body edge shape is modified;

FIGURE 6 is a front elevational view similar to FIG. 1 showing the container cover remover and tightener mechanism depicting a further modification of the body edge shape.

Although the illustrated container cover remover and tightener mechanism is not limited to use on fixtures of the kitchen, it is shown in forms which are adapted to such use. When mounted as shown, the mechanism is exposed below the exterior surface of a convenient kitchen fixture. The illustrated container cover remover and tightener is self adjustable to accommodate container covers of different diameters and effect their removal or tightening.

Figure 1:
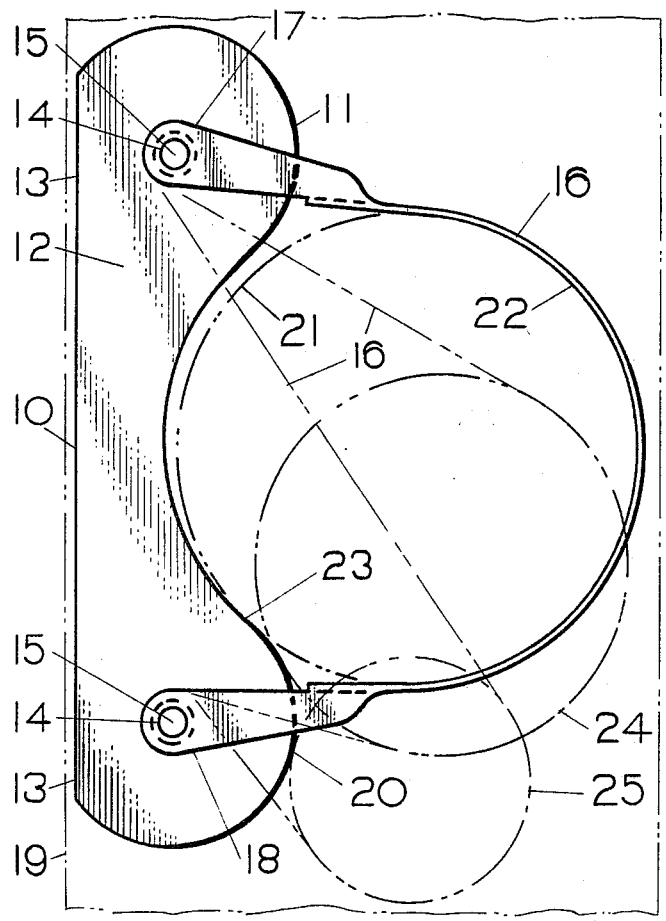
Figure 2:
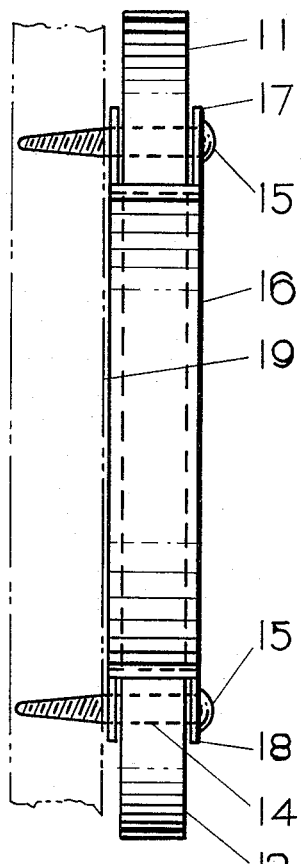
FIGURE 2 is a side elevational view of the container cover remover and tightener mechanism shown in FIG. 1, with the fixture upon which it is mounted illustrated fragmentarily in dot and dash lines.
Figure 3:
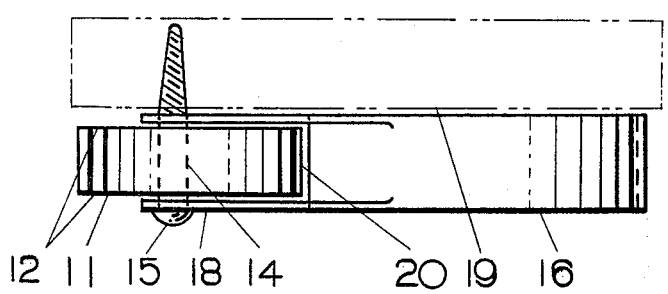
FIGURE 3 is an end elevational view of the container cover remover and tightener mechanism shown in FIG. 1, with the fixture upon which it is mounted illustrated fragmentarily in dot and dash lines.

Having reference to the drawings, and particularly to FIGURES 1 to 3 thereof, wherein an embodiment of the invention is shown for illustrative purposes, my container cover remover and tightener mechanism 10 has a body 11 having substantially flat side surfaces 12. The two end portions 13 of body 11, have holes 14 provided for the accommodation of fastening means, such as screw bolts 15, by which a shaped strap 16 has its two ends 17 and 18 rotatably connected for swinging movement. The screw bolts 15 also serve for securing the container cover remover or tightener 10 to the surface of a structure 19. The body 11, has an edge surface shape 20, against which the outer perimeter edge of the container covers bear when enclasped by the mechanism for removal or tightening, which consists of a concave shape at the body's central portion which blends to convex shapes at the end portions of said body. In FIG. 1, a large diameter container cover 21 is shown enclasped between the inner surface 22 of the strap 16 and point 23 on the shaped edge surface 20 of the body 11. Also in FIG. 1, medium and small diameter container covers 24 and 25 are shown enclasped by the mechanism and designated by dot and dash lines.

The body 11, in one form, in the region against which the outer perimeter edge of container covers bear when enclasped by the mechanism for removal or tightening, is made from material that is relatively soft and resilient such as certain rubbers, synthetic rubbers, plastics, or compounds of the above with other materials, said material having the capacity of relatively high frictional surface and complete recovery from deformation caused by the container covers.

The strap 16, in its preferred form, is fabricated from material possessing resilience and flexibility, such as certain metals or metal alloys having spring capability with the capacity of having complete recovery to its original shape after being repeatedly flexed and stressed by being deflected to enclasp container covers of differing diameters. The strap 16 will also perform satisfactorily if fabricated from certain types of plastics, fabrics and webbings of different materials.

Figure 4:
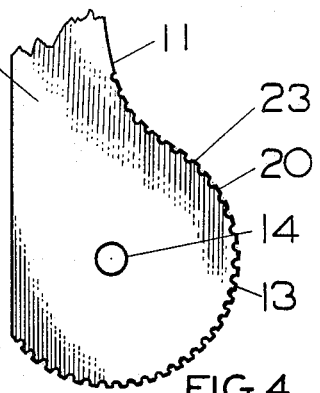
FIGURE 4 is a detail of a portion of the body of FIG. 1 showing a modified edge surface of said body.

In a modified structure of my container cover remover and tightener, which is illustrated in FIG. 4, the shaped edge 13 of the body 11 is shown having a serrated or roughened surface. With this modification, the body 11 will perform satisfactorily if fabricated from relatively hard materials such as certain metals, hard rubbers, hard plastics, and hardwoods or combinations of materials.

In another modified structure of my container cover remover and tightener mechanism, which is illustrated in FIG. 5, the body 26 has an edge surface 27, against which the outer perimeter edge of the container covers will bear when enclasped by the mechanism for removal or tightening, which consists of a straight surface at the body's central portion blending into a convex curved surface at one end.

In another modified structure of my container cover remover and tightener mechanism, which is illustrated in FIG. 6, the body 28 has a convex shaped edge 29 against which the outer perimeter edge of the container covers bear when enclasped by the mechanism for removal or tightening.

The container cover remover and tightener mechanism, illustrated in FIGS. 1 to 4, is used as follows:

The container is hand held and its cover inserted into the opening defined by the shaped edge 13 of the body 11 and the inner surface 22 of the strap 16, after which, the container is manually moved and rotated successively in a clockwise direction effecting a tension stress in the strap 16, wrapping of said strap against the container cover, and bearing of said container cover edge against the shaped edge surface 13 of body 11 resulting in deflection and compressive stress in said shaped edge surface 13 and resulting in the container cover being first enclasped and then loosened by the mechanism.

Tightening of container covers is accomplished by the same procedure stated above excepting the container cover, after insertion into the mechanism is manually moved and rotated successively counter-clockwise.

Loosening of container covers in the modified mechanism illustrated in FIGS. 5 and 6 is accomplished by the same procedure stated above for the mechanism illustrated in FIGS. 1 to 4.

Tightening of container covers in the modified mechanism illustrated in FIGS. 5 and 6 is accomplished by the same procedure stated above for the mechanism illustrated in FIGS. 1 to 4 excepting that it is used with the up side facing down.

Thus by reference to the drawings and the description of the structure and operation of the disclosed invention, it may be observed that I have provided a novel and simple device, manually operated, and consisting of a body and a strap that is self-adjusting to enclasp and remove or tighten container covers of different diameters.

From the above description of several typical illustrative forms of my invention, the underlying principles thereof will be readily gathered. It is of course to be understood, however, that the particular embodiments of the invention herein disclosed are for illustrative purposes only, and that various changes in design, structure and arrangement may be made therein without departing from the spirit and scope of the invention or of the appended claims.

Having thus described my invention, what I claim as new and desire to secure by Letters Patent of the United States is:

1. In a self-adjusting container-cover remover, comprising a circular flat body having a serrated surface at its periphery to provide gripping friction against the rotational movement of container-covers of different diameters, a resilient flat spring strap having its two ends permanently attached at spaced and fixed relationship to said circular flat body by means of pins, one of said pins being secured to said body adjacent its periphery, said one pin being directly attached to a strap end, said spring strap being rotatable on said pins and thus automatically firmly enclasping container-covers of different diameters when said container-covers are inserted into the loop formed by said spring strap and moved in a direction to reduce the size of said spring strap loop by wrapping of said strap around said body, said container-covers being removable by rotation of said containers, said spring strap automatically springing back to its fully open position and shape for further use when said container-covers are removed.

2. In a self-adjusting container-cover remover, as defined in claim 1, wherein the resilient flat spring strap has the remaining end pivotable about the center axis of said circular flat body.

3. In a self-adjusting container-cover remover, comprising a circular flat body and a resilient spring strap, said spring strap being loop-shaped and having its two ends permanently attached to said circular flat body by pins, one of said pins being at the center axis of the circular flat body and the other pin attachment being near the outer periphery of said circular flat body and being directly attached to one end of said strap, said spring strap end portion attached at the circular flat body center axis being rotatable concentrically over a major portion of said circular flat body circumference, said spring strap end portion attached at the outer periphery of said circular flat body being wrappable over a major portion of the circular flat body outer periphery surface.

References Cited by the Examiner

UNITED STATES PATENTS

| 375,155 | 12/1887 | Haynes | 81—69 |
| 381,213 | 4/1888 | Christie | 81—343 |
| 1,193,308 | 8/1916 | Stone | 81—58 |
| 1,319,980 | 10/1919 | Von Tell. | |
| 1,416,685 | 5/1922 | Bufford | 81—69 |
| 2,793,550 | 5/1957 | Robinson et al. | 81—343 |

FOREIGN PATENTS

| 11,064 | 5/1910 | Great Britain. |

WILLIAM FELDMAN, *Primary Examiner.*

G. WEIDENFELD, *Assistant Examiner.*